United States Patent Office 3,287,313
Patented Nov. 22, 1966

3,287,313
SHAPED ARTICLES CONTAINING POLYVINYL ALCOHOL, BENTONITE AND STEARAMIDE
Saburo Imoto, Kurashiki-shi, Japan, assignor to Kurashiki Rayon Co., Ltd., Kurashiki-shi, Japan, a corporation of Japan
No Drawing. Filed Dec. 5, 1962, Ser. No. 242,357
Claims priority, application Japan, Dec. 7, 1961, 36/43,925
6 Claims. (Cl. 260—41)

This invention relates to compositions containing polyvinyl alcohol and more particularly to compositions of polyvinyl alcohol and bentonite.

The compositions of this invention contain from 25 percent to 80 percent by weight of polyvinyl alcohol and from 20 to 75 percent by weight of bentonite, based on the total weight of polyvinyl alcohol and bentonite. The combined amounts of polyvinyl alcohol and bentonite generally constitute at least 90 percent of the total weight of the composition. Compositions according to one embodiment of this invention consists essentially of these two ingredients in the above stated proportions. According to another embodiment of the invention, the compositions may contain polyvinyl alcohol and bentonite in the above stated proportions, plus up to 10 percent by weight, based on the combined polyvinyl alcohol and bentonite of an organic anti-swelling agent.

The compositions of this invention have greater tensile strength, lower elongation, and greater water resistance than pure polyvinyl alcohol. Compositions containing polyvinyl alcohol and bentonite alone display somewhat greater water resistance than does pure polyvinyl alcohol, as evidenced by less swelling in water, greater tensile strength when immersed in water, and greater hot water resistance. However, the water resistance and particularly resistance to swelling in water can be markedly improved by the incorporation of up to 10 percent by weight of an anti-swelling agent, based on the combined weight of polyvinyl alcohol and bentonite.

Polyvinyl alcohol suitable for the compositions of this invention may be either fully hydrolyzed polyvinyl alcohol, partially hydrolyzed polyvinyl alcohol or copolymers of polyvinyl alcohol with allyl alcohol, isopropynol alcohol, or a vinyl ether. In either partially hydrolyzed polyvinyl alcohol or copolymers of polyvinyl alcohol, the vinyl alcohol groups constitute the majority of the groups in the polymer chain, and the comonomer groups (such as vinyl acetate in the case of partially hydrolyzed polyvinyl alcohol, or allyl alcohol, or a vinyl ether in the case of a copolymer) constitute only a minority of the groups in the polymer chain.

The clay constituent of the composition is preferably bentonite, but may be an equivalent expansible lattice type clay having a large quantity of water contained in the crystalline lattice. Examples of equivalent clays include vermiculite and glauconite.

Various organic anti-swelling agents may be incorporated in the composition. These substances generally fall into two categories. The first category embraces compounds having a cationic radical which is exchangeable with the cation in bentonite. A preferred anti-swelling agent of this invention, which is a member of this group, is a chromic chloride stearate complex. This compound is effective even in very small amounts, but may be used in large amounts up to 10 percent by weight or more, based on the combined weight of polyvinyl alcohol and bentonite. The second group of anti-swelling agents are non-anionic compounds, notably amides such as stearamide.

The compositions of this invention can be prepared by mixing the ingredients in finely divided form and then drying the mixture. The mixtures may be heat treated or not as desired. In general, heat treatment increases the modulus and reduces elongation. The time and temperature of heat treatment vary inversely with respect to each other. For instance, heat treatment can be carried out at 100° C. for one or two hours, or at 180° C. for a short time, e.g. 10 seconds.

The polyvinyl alcohol-bentonite compositions of this invention are particularly useful as molding compositions. They are also useful as materials for making fibers, sizing agents, and films. These compositions can be used generally in place of pure polyvinyl alcohol to advantage in any instance where increased strength, lower elongation, and increased water resistance are desirable. In addition, the compositions of this invention can be used as construction material, as for example in the building construction industry, where polyvinyl alcohol would not be suitable. Other uses will be evident to those skilled in the art.

This invention will now be described with reference to specific embodiments thereof, as illustrated in the examples which follow.

*Example 1*

To aqueous suspensions of refined bentonite were added different amounts of an aqueous solution of 99 percent hydrolyzed polyvinyl alcohol having a degree of polymerization of 1700. The polyvinyl alcohol and bentonite were mixed in proportions to give compositions containing 25 percent, 50 percent, and 75 percent by weight of bentonite, based on the combined weight of polyvinyl alcohol and bentonite. These mixtures were agitated and well mixed to achieve uniform compositions. Film having a thickness of 0.05 mm. were made from each of these compositions. For control purposes films were also made from the polyvinyl alcohol solution unmixed with bentonite. These films were placed in an atmosphere at room temperature (about 20° C. and relative humidity 40 to 50 percent) and then were dried at 50° C. for two days under reduced pressure. Some of the films made in this manner were tested after drying without further heat treatment. Other films were subjected to a heat treatment at 100° C. for two hours, and a third group of films were heat treated at 180° C. for ten seconds. All of these films were then tested for tensile strength and elongation at 20° C. and 65 percent relative humidity. Results are shown in Table I below.

TABLE I.—INITIAL TENSILE STRENGTH MODULI

| Heat Treatment | Bentonite Content (percent) | Tensile Strength (kg./cm.²) | Elongation Rate (percent/min.) | Modulus (kg./mm.²) |
|---|---|---|---|---|
| None | 0 | 500 | 250 | 140 |
|  | 25 | 750 | 100 | 466 |
|  | 50 | 900 | 10 | 708 |
|  | 75 | 650 | 10 | 582 |
| 100° C. for 2 hrs | 0 | 700 | 250 | 249 |
|  | 25 | 1,400 |  |  |
|  | 50 | 1,800 | 10 | 1,432 |
|  | 75 | 1,050 | 10 | 1,455 |
| 180° C. for 10 sec | 0 | 800 | 250 | 249 |
|  | 25 | 1,600 | 10 | 875 |
|  | 50 | 2,200 | 10 | 1,502 |
|  | 75 | 1,100 | 10 | 1,820 |

As Table I shows, films of polyvinyl alcohol-bentonite mixtures have considerably higher tensile strength than those of pure polyvinyl alcohol. Furthermore, the films made from the mixtures have higher modulus, indicating lower elongation. The tensile strength is greatest in films containing 50 percent by weight each of polyvinyl alcohol and bentonite. Heat treatment considerably improves the tensile strength of these compositions, particularly, the maximum tensile strength attained with compositions containing equal parts of polyvinyl alcohol and bentonite.

*Example 2*

Films were prepared as described in Example 1, except that the bentonite contents and thickness of the film are as indicated in Table II below. These films were not heat treated. They were tested at a temperature of 20° C. and a relative humidity of 65 percent, and then an elongation rate of 300 percent per minute.

TABLE II.—STRENGTH AND ELONGATION OF COATED FILMS

| Bentonite Content (percent) | Thickness of Coated Film (mm.) | Tensile Strength (kg./cm.²) | Breaking Elongation (percent) |
| --- | --- | --- | --- |
| 0 | 0.089 | 540 | 278.0 |
| 20 | 0.061 | 850 | 15.2 |
| 30 | 0.054 | 840 | 10.3 |
| 40 | 0.051 | 950 | 6.9 |

This example shows that admixture of polyvinyl alcohol and bentonite results in films having materially greater tensile strength and far lower elongation at the point of rupture than films of pure polyvinyl alcohol.

*Example 3*

Films were prepared according to Example 1 and heat treated at 100° C. for 2 hours. The percentage shrinkage during heat treatment is given in Table III below.

TABLE III.—SHRINKAGE PERCENTAGE

| Bentonite content, percent | Shrinkage percentage |
| --- | --- |
| 0 | 2.99 |
| 25 | 0.83 |
| 50 | 0.61 |
| 75 | 0 |

*Example 4*

Films were made according to the procedure of Example 1, omitting heat treatment in all cases, and were then submerged in water at 100° C. for 30 minutes. Films containing 50 percent by weight of bentonite were intact after 30 minutes submerged at 100° C., while films made from pure polyvinyl alcohol and from a mixture of 75 percent polyvinyl alcohol and 25 percent bentonite were ruptured after immersion.

*Example 5*

Films were made from polyvinyl alcohol and from mixtures of polyvinyl alcohol and bentonite according to the procedure of Example 1. All of the films in this example were heat treated at 100° C. for one hour, and then submerged in water at 60° C. for 24 hours. The degree of swelling (stated as percentage weight gain), the solubility of the film (stated as percentage which was dissolved), and the percentage expansion in surface area, were determined. Results are given in Table IV below.

TABLE IV.—WATER RESISTING PROPERTIES OF POLYVINYL ALCOHOL FILMS CONTAINING BENTONITE
[Dipped in water 60° C. for 24 hrs. with films heat treated at 100° C. for 1 hr.]

| Bentonite Content (Percent) | Degree of Swelling (Percent) | Solubility (Percent) | Percent Expansion in Area |
| --- | --- | --- | --- |
| 0 | 9.75 | 47.8 | (¹) |
| 25 | 5.98 | 16.9 | 20 |
| 50 | 3.95 | 7.5 | 21 |
| 75 | 4.03 | 0.8 | 13 |

¹ Deformed, not determinable.

*Example 6*

A solution of 99 percent hydrolyzed polyvinyl alcohol having a degree of polymerization of 1700 was mixed with an aqueous suspension of bentonite to give a composition containing 75 percent by weight of bentonite, based on the total amount of bentonite and polyvinyl alcohol. After this mixture had stood for several minutes, a chromic stearyl chloride complex

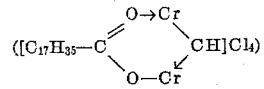

in aqueous solution and a neutralizing solution consisting of 5.0 percent sodium formate, 0.3 percent formic acid, 16.0 percent urea, and 78.7 percent water, were added to the mixture. The amounts of chromic chloride stearate complex are indicated in Table V below. After mixing and agitation of the resulting solution, films were formed at 50° C., dried, and heat treated at 120° C. for 30 seconds. The degree of swelling and the percentage increase in surface area of these films were determined. Results are shown in Table V below.

TABLE V

| Percent by wt. of Chromic Chloride Stearate Complex Added | Percent wt. increase on swelling | | | Percent increase in surface area | | |
| --- | --- | --- | --- | --- | --- | --- |
| | 30° C., 24 hrs. | 60° C., 24 hrs. | 100° C., 1 hr. | 30° C., 24 hrs. | 60° C., 24 hrs. | 100° C., 1 hr. |
| 0 | 3.38 | 4.44 | 19.65 | 14.8 | 20.0 | (¹) |
| 4.5 | 1.39 | 2.08 | 3.50 | 3.0 | 5.7 | 14.3 |
| 7.5 | 1.08 | 1.40 | 1.38 | 5.7 | 5.8 | 6.2 |

¹ Film broke.

*Example 7*

An aqueous solution of 99 percent hydrolyzed polyvinyl alcohol having a degree of polymerization of 1700 was mixed with an aqueous suspension of bentonite to give a mixture containing 70 per cent bentonite and 30 percent polyvinyl alcohol, based on the combined weight of these two ingredients. Films were formed from the resulting solution. These films were dipped in water at 30° C., and then in a mixed solution of chromic chloride stearate complex and a neutralizing agent at 30° C. for one hour. The films were then dried at 50° C. under reduced pressure and were heat treated at 120° C. for 20 minutes. Finally these films were submerged in an aqueous bath at 30° C. for 24 hours to test their water resistance properties. Results are shown in Table VI below.

TABLE VI.—WATER RESISTING PROPERTIES OF FILMS DURING SUBMERSION

| Concentration of Chromic Chloride Stearate Complex, Percent | Degree of Swelling | Percent Increase in Area |
| --- | --- | --- |
| 0 | 3.72 | 19.0 |
| 0.55 | 0.46 | 6.6 |
| 1.13 | 0.41 | 5.6 |
| 2.25 | 0.51 | 2.5 |

As the above table shows, immersion of the films in a solution of chromic chloride stearate complex markedly improves their resistance to swelling.

*Example 8*

Films containing 75 per cent by weight of bentonite and 25 per cent by weight of polyvinyl alcohol were prepared according to the procedure of Example 1. These films were dried at 100° C. for 16 hours, immersed in water at 30° C., and then immersed in a solution containing 20 percent by volume n-propyl alcohol and 80 percent by volume of water, based on the total solvent volume, plus stearamide in amounts indicated in Table VII below. The films were maintained in this solution at 75° C. for one hour to permit adsorption of stearamide. The films were then dried at 100° C., and then submerged in water at 75° C. for 24 hours to determine their water resistance properties. Results are shown in Table VII below.

TABLE VII.—SWELLING DEGREES OF FILMS TREATED WITH STEARAMIDE

| Concentration of Stearamide in Solution (Percent) | Swelling Degree | Percent Increase in area |
|---|---|---|
| 0 | 2.06 | 9.0 |
| 6 | 1.87 | 7.0 |
| 8 | 1.80 | 11.0 |
| 10 | 1.24 | 7.3 |

While this invention has been described with reference to specific embodiments thereof, these embodiments are merely illustrative, and the scope of the invention shall be measured by the scope of the appended claims.

I claim:

1. An article of manufacture comprising a shaped composition having high tensile strength, low elongation and high water resistance consisting essentially of from 25 percent to 80 percent by weight of polyvinyl alcohol, from 20 percent to 75 percent by weight of bentonite, and up to 10 percent by weight of stearamide, all of the weight percentages being based on the combined weight of polyvinyl alcohol and bentonite.

2. In a process of producing shaped articles from a polyvinyl alcohol composition, the improvement of adding bentonite to said polyvinyl alcohol composition and thereafter shaping the polyvinyl alcohol bentonite-containing composition to produce an article having high tensile strength, low elongation and high water resistance, said polyvinyl alcohol bentonite-containing composition consisting essentially of from 25 percent to 85 percent by weight of polyvinyl alcohol, from 20 percent to 75 percent by weight of bentonite, and up to 10 percent by weight of stearamide, all of the weight percentages being based on the combined weight of polyvinyl alcohol and bentonite 3. The process of claim 2 further including heat treating the shaped article at a temperature of about 100° to 180° C. for a period of about 10 seconds to 2 hours to increase the modulus and reduce elongation thereof.

4. The process of claim 2 wherein said shaping comprises forming a film of said polyvinyl alcohol bentonite-containing composition.

5. A film having high tensile strength, low elongation and high water resistance consisting essentially of from 25 percent to 80 percent by weight of polyvinyl alcohol, from 20 percent to 75 percent by weight of bentonite, and up to 10 percent by weight of stearamide, all of the weight percentages being based on the combined weight of polyvinyl alcohol and bentonite.

6. An article of manufacture comprising a heat treated, shaped composition having high tensile strength, low elongation and high water resistance consisting essentially of from 25 percent to 85 percent by weight of polyvinyl alcohol, from 20 percent to 75 percent by weight of bentonite, and up to 10 percent by weight of stearamide, all of the weight percentages being based on the combined weight of polyvinyl alcohol and bentonite, said heat treatment comprising heating said article at a temperature of from about 100° to 180° C. after shaping thereof.

References Cited by the Examiner

UNITED STATES PATENTS

| 2,795,568 | 6/1957 | Ruehrwein | 260—41 |
| 2,892,731 | 6/1959 | Claxton | 260—29.6 |
| 2,948,697 | 8/1960 | Robertson | 260—32.6 |
| 3,084,133 | 4/1963 | Sirota et al. | 260—29.6 |
| 3,200,094 | 8/1965 | Sederlund et al. | 260—29.6 |

OTHER REFERENCES

Kirk et al.: "Encyclopedia of Chemical Technology" (1951), vol. 6, p. 222.

DuPont Bulletin "Elvanol Polyvinyl Alcohol for Adhesives and Binders," V2–254 (1947), p. 2.

LEON J. BERCOVITZ, *Primary Examiner.*

DONALD E. CZAJA, R. A. WHITE,
*Assistant Examiners.*